United States Patent Office 3,443,856
Patented May 13, 1969

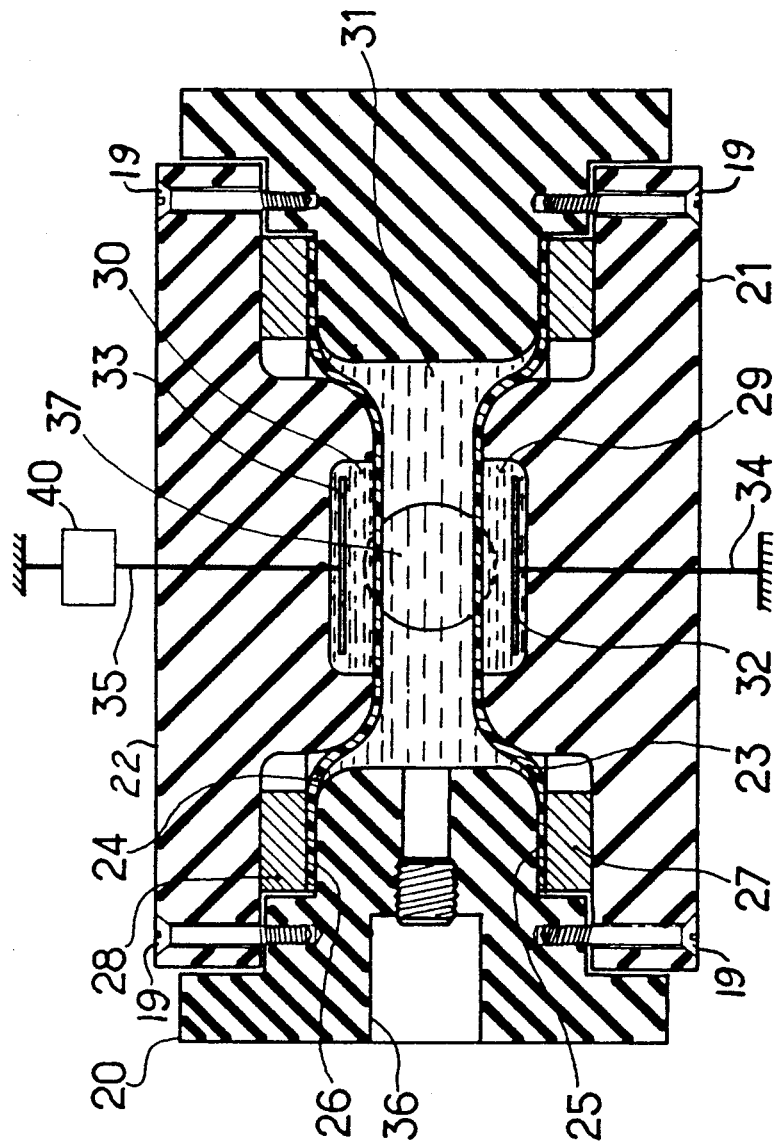

3,443,856
ELECTRICAL APPARATUS UTILIZING A
DIELECTRIC MEDIUM
Noël Joseph Felici, 13 Rue Charles Peguy, and Georges
Bernard Briére, 1 Blvd. Marechal Joffre, both of Grenoble, Isere, France
Filed Aug. 4, 1964, Ser. No. 387,286
Claims priority, application France, Aug. 12, 1963,
4,604
Int. Cl. G02f 1/26; H01g 9/08; B01d 13/02
U.S. Cl. 350—150                                11 Claims

ABSTRACT OF THE DISCLOSURE

A capacitive assembly or Kerr cell having three juxtaposed compartments in a fluid-tight container, the central compartment being separated from the side compartments by permeability-selective membranes which are respectively permeable to positive and negative ions. The central compartment is filled with a reasonably pure polar liquid which may be the same as or may differ from the liquid inserted in the side compartments. The liquid in the three compartments preferably is static and does not circulate. Upon the application of a high D.C. voltage across the electrodes, selective migration of positive and negative impurity ions takes place from the central compartment through the corresponding permeability-selective membranes into the side compartments, bringing about a depletion of the impurity ions in the liquid in the central compartment thus exhibiting an extremely high dielectric constant.

---

This invention relates to electrical apparatus of the class utilizing a medium possessing a high dielectric constant. There are many different types of electrical instruments and devices which, in use, involve the presence of an intense electric field established between a pair of electrodes, and consequently require the provision of a body of substance possessing extremely high resistivity, dielectric constant and breakdown voltage in the area of the intense field.

Objects of this invention are to provide apparatus of this general class which will possess greatly improved operating characteristics over comparable apparatus of conventional character, more specifically, to permit the prolonged use of polar liquids as dielectric media in various types of apparatus involving the presence, in operation, of an intense electric field through the medium; other objects will appear. A further object is to provide a method and means for producing polar liquids with high dielectric constant and possessing high purity and resistivity.

It has already been proposed to use polar liquids of high purity, as obtained by subjecting the liquid to an ion-exchange purification process, as the dielectric medium in various apparatus exposed to intense electric fields. Polar liquids thus purified have been found initially to possess remarkably high dielectric properties unparalleled by most other categories of substances. It has also been found, however, that these high initial characteristics are not maintained but fall off sharply during operation of the apparatus owing to contamination of the liquid from various sources. Extremely small amounts of contaminant, such as the minute concentrations of matter dissolved away from the wall surfaces of the glass or other vessels in which the liquids are contained, are sufficient to cause a sharp drop in the dielectric properties of the liquid and hence completely destroy the advantages expected from the use of polar liquids.

It has previously been proposed to overcome the difficulty by providing means for continually purifying the dielectric liquid during operation of the apparatus in which it is used, as by providing for a continuous circulation of the liquid through a closed flow circuit which includes the apparatus and purifying means exterior to the apparatus, circulator means being provided for continuously cycling the liquid around the circuit so as to feed purified liquid into the apparatus. Such a set-up has been found quite satisfactory in many cases where system dimensions and complexity do not constitute limiting factors, and it has made possible the continued presence, within the electric filed of the apparatus, of a pure polar liquid having resistivity and dielectric characteristics of values heretofore unattainable by other means. It will easily be understood, however, that such an arrangement is entirely unsuitable in a great many applications, e.g., miniature instruments, where small bulk, low weight, low power consumption and simplicity are essential requisites, and that it would in any case be extremely desirable to achieve the extremely high dielectric values of polar liquids in a permanent manner throughout the service life of the apparatus involved, without having to provide the cumbersome and complicated equipment comprising the fluid circulating and purifying means as well as the excess body of liquid necessarily present in such an arrangement. It is a specific object of the present invention to accomplish this result.

In accordance with the present invention it has been discovered that a polar liquid exposed to a strong electric field can be continuously purified in situ, and brought to and maintained at a state of maximum dielectric properties, if said liquid be located in the central one of three juxtaposed liquid-filled compartments in a container, said central compartment being separated from the side compartments by semi-permeable diaphragms respectively of cathodic and anodic character, and with cathode and anode electrodes being respectively disposed in said side compartments and being connected to the respective terminals of a high-voltage source in order to create said electric field.

It will be appreciated that the over-all operation of such a system resembles that of an electrodialysis cell in that there is a selective and preferential migration of positive ions from the central compartment through one semi-permeable diaphragm into the side compartment containing the cathode, and a selective migration of negative ions from the central compartment through the other semi-permeable diaphragm into the other side compartment containing the anode, thereby bringing about a depletion of the central compartment in ions of either sign, and hence a purification of the liquid filling the central compartment. Experiments have shown, however, that concurrently with this outward flow of ions from the central into the outer compartments, there apparently occurs a simultaneous inward flow of ions from the outer into the central compartment at a lower rate than the rate of outward flow, and that the ions thus entering the central compartment recombine therein to form a liquid compound which may be identical in composition to that of the initial liquid or may differ therefrom, but which invariably possesses an extremely high dielectric constant and extremely low conductivity.

While the liquids initially introduced into the side compartments may differ from the liquid in the central compartment, especially good results have been obtained when a common liquid is initially used to fill all three compartments.

The invention will now be further described for illustrative purposes but without limitative intent with reference to the accompanying drawings, wherein:

FIG. 2 is a simplified sectional view of a Kerr cell device constructed in accordance with the teachings of the invention;

Figure 1:
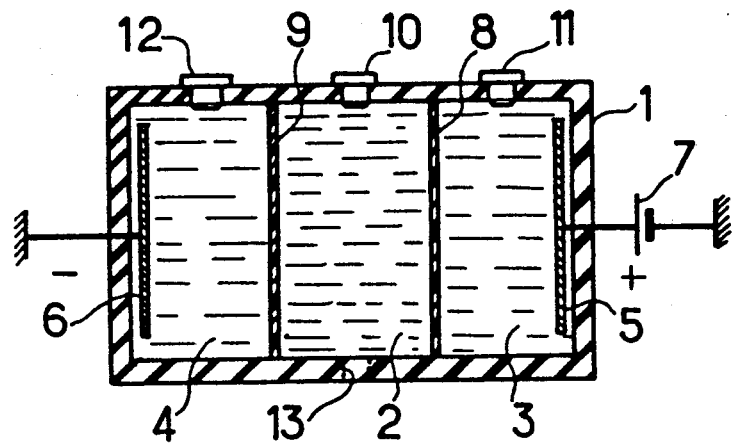
FIG. 1 is a schematic sectional view of a simple form of embodiment of the invention illustrating the operative principle applied.

As earlier indicated the invention is applicable to a wide class of electrical systems involving the creation of intense unidirectional fields. The simple embodiment of the invention illustrated in FIG. 1 may be considered as constituting or forming part of any such apparatus, for example a high-capacitance condenser.

The apparatus shown comprises an enclosure 1 made of any suitable liquid-tight and electrically insulating material and of any suitable shape, e.g. rectangular parallelopipedic or cylindrical. Mounted in spaced relation within the enclosure 1 so as to define therein the three juxtaposed compartments 2, 3 and 4, are two spaced semi-permeable diaphragms or permeability-selective membranes 8 and 9. These membranes may be made from any suitable ion-exchange materials and are available from various sources on the current market, e.g. from the American Machine Foundry Corporation or from Ionics Incorporated. In the example, selective membrane 8 is of the anodic type, i.e. is of such nature as to pass negative ions rather than positive ions, while selective membrane 9 is of the opposite or cathodic type. The membranes or diaphragms 8 and 9 are bonded at their peripheries to the inner wall of container 1 by means of suitable electrically insulating adhesive, and the bonds must be made strong enough to hold the membranes 8 and 9 in their fixed positions despite the relatively strong electrostatic attraction forces that are applied to the membranes in operation.

Arranged in the side compartments 3 and 4 near the outer ends of the container 1 are a pair of large-area plate electrodes 5 and 6 respectively, which are connected to the positive and negative (ground) terminals of a high-voltage D.C. source 7, for example an electrostatic generator. The three compartments 2, 3 and 4 are provided with filling orifices sealed with plugs 10, 11, 12 of insulating material.

The central compartment, prior to sealing at 10, is filled with an organic polar liquid selected to have almost no natural ionization or a very low natural ionization factor, so that its theoretical specific resistivity, which is directly related to ionic dissociation constant and ion mobility, is very high. Nitrobenzene, nitrotoluene, acetone and acetonitrile are satisfactory polar liquids for use in the central compartment of a system according to the invention.

The side compartments 3 and 4 are similarly filled with liquid through the filling apertures 11, 12 before being sealed with the plugs. In a currently preferred embodiment of the invention, which is both simplest and apparently gives the most efficient results, the side compartments 3 and 4 are initially filled with the same liquid as is the central compartment 2. It is found in practice that the extremely low natural ionization present in the liquid in the central compartment is sufficient to initiate an electrodialysis action whereby a selective migration of positive and negative ions from the central compartment 2 occurs through the semi-permeable membranes 9 and 8 respectively into the side compartments 4 and 3. The ion concentration in the central compartment decreases and its resistivity increases. In a very short time, of the order of some seconds, the resistivity of the liquid in the central compartment attains a value approaching its theoretical maximum, and the loss current through the condenser defined by the electrode plates 5 and 6 drops to a negligible value. The full voltage across said electrodes is available to create an intense electric field through the liquid dielectric in the central compartment. These optimum operating conditions are retained for practically indefinite periods of time throughout the service life of the apparatus without it being necessary to renew or regenerate the liquid in the central or the side compartments at any time. The container 1 may therefore remain permanently sealed, completely eliminating maintenance and service problems in this respect.

If desired, in order to preclude the possible creation of concentration gradients in the side compartments adjacent to the electrodes, agitation may be imparted to the liquid therein, e.g. at intermittent periods. This precaution, however, has been found in most cases superfluous. Also, in some cases it may be considered desirable to establish a circulation of liquid through the central compartment, e.g. for reasons of temperature control or other motives. To indicate this possibility, a liquid outlet is illustrated in broken lines at 13, it being understood that in these conditions the plug in the filling aperture 10 would be omitted and the apertures 10 and 13 would then be connected to respective inlet and outlet lines for the liquid. Such liquid circulation, if used in a system according to the invention, should be effected at a flow rate slow enough to allow the electrodialysis process characterizing the invention to proceed unimpaired. It is again emphasized that the operation of the invention does not require any circulation of the dielectric liquid, and indeed in the preferred embodiments of the invention no such circulation is provided and the central, as well as the side compartments, are preferably sealed in a permanent manner.

As one example of the many and different types of apparatus to which the teaching of the invention is applicable, FIG. 2 illustrates a Kerr cell of a general type conventionally used in the electro-optical recording of sound on cinema film sound tracks as well as for other purposes.

The Kerr cell assembly shown in FIG. 2 comprises a generally annular body 20, which is conveniently made from the material known by the trade name Teflon. Mounted in the ends of the body 20 are bottom and top members 21 and 22, which may be made of similar material as the body, and are secured in end openings of the body 20 through any suitable means, as by screws 19 or otherwise. The members 21 and 22 have protuberant inner portions projecting towards each other but having their inner ends spaced from each other. A pair of semi-permeable membranes 23 and 24 made of elastically flexible ion-exchange sheet material have their marginal portions clamped against shoulders 25, 26 defined by recesses of the body member 20, by means of clamping rings 27 and 28 respectively, which may be made of stainless steel, nylon or other suitable material. The retainer rings 27, 28 themselves are blocked in position by engagement with flanges of the bottom and top members 21, 22. The membranes 23, 24 have radially intermediate portions extending between adjacent rounded surfaces of the body member 20 and the related end member 21 or 22, as shown, and have central portions which extended in elastically stretched condition across the end openings of recesses 29, 30 respectively, formed in the protuberant end parts of the end members 21 and 22. It will be understood that the drawing shows the various parts of the assembly in spaced-apart or exploded relationship for clarity, but that in the operative condition the parts are tightly clamped with one another so that the membranes 23 and 24 then partition the interior space defined between the members 20, 21 and 22 into three separate liquid-tight compartments. That is, there are defined the two outer compartments 29 and 30 in the end recesses of the members 21 and 22, exteriorly of the central regions of the membranes 23 and 24, and there is a central compartment 31 defined between the two membranes 23 and 24 and laterally limited by the inner side wall surface of the body member 20.

Disposed within the side compartments 29 and 30 adjacent to the inner end surfaces of the recesses in members 21, 22 are a pair of electrode plates 32 and 33 of a highly unoxidizable metal such as platinum. The electrodes are connected through wires 34, 35 extending through the members 21, 22 with external terminals, not shown.

A transverse passage 36 is formed through a side of the body member 20 to connect with the central compartment 31 therein. The passage 36 has an enlarged opening at its outer end adapted to be sealed with a plug, not shown, and serving to introduce liquid into the central compartment.

The member 20 is further formed with a diametric passage 37 at right angles to the passage 36. The radially inner ends of the passage 37 adjacent to the compartments 29, 30, 31 are sealed from the interior of the compartments by means of suitable transparent material, such as glass or a suitbale transparent plastic. With the respective radial sections of the passage 37, on opposite sides of the central compartment, there are associated a light polarizer element and an analyzer element, not shown, of conventional types.

To prepare the Kerr cell described for operation, a polar liquid capable of exhibiting the desired high resistivity when pure, and further having the requisite electrical double refraction, is introduced both into the side compartments 29, 30 and into the central compartment 31 through filler aperture 36. The aperture 36 may then be sealed in a permanent manner. The common liquid introduced into all three compartments may suitably be nitrobenzene.

The general operation of the Kerr cell is conventional and will only briefly be described. It is assumed the device is to be used for recording sound, e.g. from a tape recording, on to a photographic film to produce a sound track. In that case a pencil of light of constant intensity is created from a suitable source and is directed through the passage 37 from one side of the Kerr cell (e.g. below the plane of the drawing in FIG. 2), and is received on the film suitably disposed at the other side of the assembly (above the plane of the drawing). The polarizer and analyzer optical elements previously referred to, and which are respectively associated with the light-input and light-output sides of the passage 37, are relatively set to a crossed position in which the light pencil issuing from the source is normally extinguished due to the crossed-polarization effect so that no light impinges on the film. When a high direct voltage is applied across the electrodes 32, 33 from a source indicated at 40 to create a strong electric field in the central region of passage 37, with the field vector being normal to the path of the light pencil, double refraction occurs and the light waves of the extraordinary ray are rotated so that light reappears at the output end of passage 37 and exposes the film. This is the well-known Kerr electro-optical effect. The amount of light falling on the film is related to the square of the voltage value across the electrodes 32, 33. Thus if there is superimposed over the constant high voltage connected across the leads 34, 35, a modulated voltage from the pick-up head of a sound recorder or from another suitable sound pick-up means, the desired sound track will be obtained on the film.

It will be realized that in the above described construction of an otherwise conventionally operating Kerr cell assembly, the improvement introduced by the present invention resides essentially in the provision of the two spaced permeability-selective diaphragms 23, 24 which define the three juxtaposed compartments 29, 30, 31, with the field-creating electrodes 32, 33 being positioned in the side compartments 29, 30. As earlier explained, the polar liquid, e.g. nitrobenzene, introduced into the central compartment 31 a very short time after application of the high D.C. field across electrodes 32, 33, reaches an extremely high degree of purity and thereafter maintains this degree of purity, and a correspondingly high dielectric constant and resistivity, over practically indefinite periods of time. Correspondingly, the bodies of liquid in the side compartments 29, 30, which initially were identical in chemical composition to that of the liquid in the central compartment, become gradually contaminated and their resistivity correspondingly decreases.

A Kerr cell constructed as thus described has outstanding advantages over the conventional constructions. The main advantage lies in the fact that the invention makes it practicable to use pure polar liquids for very long periods as the dielectric media of the cell, in place of the more conventional transparent dielectrics, such as carbon sulfide, which have hitherto been generally used in Kerr cells. The Kerr constant (which may be defined as the rotation angle of the light waves per unit intensity of the electric field), of polar liquids is extremely high. Thus the Kerr constant of pure nitrobenzene or nitrotoluene, the use of which is made possible by the invention over prolonged periods of time, is about 100 times greater than the Kerr constant of the usual carbon sulfide dielectric. Thus the apparatus constructed as described with reference to FIG. 2 will have a correspondingly heightened sensitivity, and will operate under correspondingly lower voltages as compared to conventional Kerr cell devices.

The high resistivity and purity of the liquid dielectric in the device described greatly reduces Joule loss effects so that the apparatus can be operated continuously for long periods of time without any tendency to a distortion of the electric field and consequent distortion of the sound record, as occurred in prior attempts at using polar liquids as dielectric media (e.g. nitrobenzene) in Kerr cells.

In this connection it is important to observe that in prior apparatus in which liquid dielectrics were subjected to strong electric fields from electrodes immersed in the liquid, unsatisfactory operation was frequently obtained due to non-homogenous field distributions that occur in the liquid in the vicinity of the electrode surfaces, which result in a local buildup of ions and consequent Joule losses of a very considerable value. These space-charge effects have heretofore limited the field strengths or voltage gradients with which liquid dielectric media could be used.

Such space-charge effects are completely absent in apparatus constructed in accordance with this invention because the electrodes are immersed, not in the body of dielectric liquid itself but in bodies of liquid separated from the dielectric by permeability-selective membranes or diaphragms. In the operation of such a device, it is these diaphragms which to all effects and purposes assume the functions of the electrodes and, as the diaphragms are completely "open-mesh" insofar as the ions of the respective polarity are concerned, no accumulation of charge occurs near their surfaces. Thus the body of dielectric liquid in the intermediate compartment between the diaphragms remains completely homogenous (electrically and chemically speaking), and completely pure throughout, for indefinite periods. The liquid therefore retains its maximum dielectric characteristics including both high resistivity and high rigidity. There are no losses of the type encountered with liquid dielectrics in the past, and no danger of breakdown until voltage gradients are reached which closely approximate the extremely high theoretical or intrinsic breakdown field value of polar liquids. In fact, pulsed field values of half one megavolt per centimeter and more have been attained in apparatus constructed according to the invention without adverse effects.

As earlier indicated, the liquids contained in the outer compartments of a system according to the invention may be the same as or may differ from the liquid used in the central compartment. Thus, acidic and basic liquids may be initially introduced into the side compartments (the terms acidic and basic are here taken in their extended meanings as applied to organic media, with "bases" being defined as proton acceptors in accordance with Brönsted's concept). Conveniently, the liquids in the side compartments may be solutions of appropriate compounds in a solvent which constitutes the liquid used in the central compartment.

However, it has been found that the use of a common polar liquid initially introduced into all three compartments of a system according to the invention not only simplifies the procedure but actually in many cases improves the results.

Figure 3:
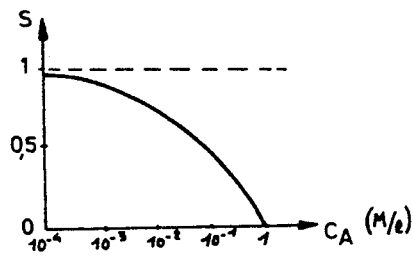
FIG. 3 is a graph indicating diaphragm selectivity as a function of ion concentration in a side compartment.

To explain this somewhat unexpected feature and at the same time provide a deeper insight into the operation of the invention, attention is directed to FIG. 3, which is a graph in which the selectivity $s$ of a semi-permeable diaphragm is plotted as a function of the concentration $c_A$ of the liquid in one of the outer compartments (compartment A) adjacent to said diaphragm. It will be noted that the selectivity $s$ increases when the concentration $c_A$ decreases, and approaches asymptotically unity as a maximum for very low concentration values. The applicants' investigations have further shown that the membrane selectivity similarly increases when the ratio $R = \rho_B/\rho_A$ where $\rho_A$ and $\rho_B$ are the resistivities of a side compartment and the central compartment respectively, decreases. The curve in this case is substantially similar to the curve shown in FIG. 4. It will thus be evident that the selectivity of the membranes, and hence the efficiency of the process, may be maximized through the use of a common liquid initially introduced into the three compartments of the invention.

It will be realized that this initial identity as between the liquid contents of the three compartments is a condition that only persists for a short time after a voltage difference has been applied between the electrodes and across the liquid in the three compartments. Due to the low but unavoidable ionization inherently present in any polar liquid, electrodialysis action occurs, resulting in a transfer of the ions of both polarities from the central compartment into the side compartments as earlier explained. The liquid in the central compartment becomes depleted in ions and its resistivity increases greatly, while the ion concentration in the lateral compartments increases. After a very short time therefore the chemical and electrical characteristics of the bodies of liquid in the side compartments become different from those in the central compartment. The liquid in the centre compartment assumes a constant high purity and resistivity and dielectric factors, while the purity and resistivity of the liquids in the side compartments gradually deteriorate with time as the liquid body in the container as a whole becomes contaminated, as through the slow dissolution of molecules from the container walls and other inevitable sources of contamination.

Figure 4:
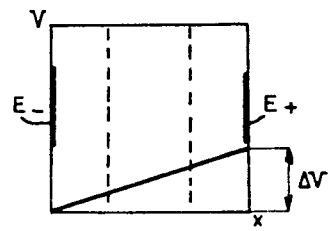
FIGS. 4 and 5 are graphs showing the voltage drop through different parts of the three-compartment system of the invention, at two different periods.
Figure 5:
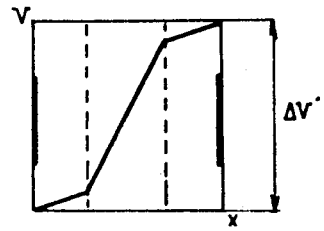

The above can be summarily visualized by referring to the graphs of FIGS. 4 and 5, which illustrate the voltage drops through the three compartments of the system of the invention when operating under constant current conditions, respectively at the initial instant at which voltage is first applied to the electrodes (FIG. 4) and in the equilibrium condition attained after a short time of operation, of the order of seconds or minutes (FIG. 5). It will be seen that in FIG. 4, the resistivity and hence the voltage gradient, as represented by the slope of the voltage curve, is the same in each of the three compartments here designated A, B and C, and its common value is relatively small, resulting in a relatively low overall voltage drop $\Delta V$ across the electrodes, here designated E— and E+. In FIG. 5, the voltage curve is seen to have a central leg of greatly increased slope, indicating a corresponding sharp increase in the resistivity of the liquid in the central compartment, while the end legs of the curve indicate resistivity values somewhat less than the initial values. The net result is a greatly increased total voltage drop $\Delta V'$ across the electrodes (under the constant-current operating conditions here assumed).

Regardless of whether the active liquid used in the central compartment is the same as or differs from the liquids introduced into the side compartments, it is of course desirable that said liquid is in a comparatively high degree of purity in the initial conditions prior to operation of the apparatus. Preliminary purification may be carried out before introducing the liquid into the apparatus, by any conventional means, such as elution over suitable ion-exchange substances. Instead of, or preferably in addition to, this preliminary purification step, it is possible to perform a pre-purifying step in situ. For this purpose, the liquid or liquids is/are introduced in a moderately pure state into the three compartments, the compartments are sealed, and voltage is applied across the electrodes. The purifying process of the invention is allowed to proceed for the requisite short time, then the voltage is disconnected, and the outer compartments are opened and emptied of their contents of relatively contaminated liquid, while the purified liquid in the central compartment is retained. The side compartments are replenished with the moderately pure liquid initially used, and are re-sealed. The apparatus may then be permanently sealed without requiring further replenishment of any of the compartments thereof during its operating lifetime.

As earlier indicated, the resistivity ratio from the central to the side compartments should remain relatively low for best operation, and in practice this means that said ratio will not generally exceed an order of $10^5$. The final resistivity attained and maintained in the liquid (e.g. nitrobenzene) of the central compartment is greater than $10^{11}$ or $10^{12}$ ohms $\times$ centimeter as orders of magnitude, at ordinary temperature. The corresponding loss angle, measured under oscillatory conditions with a 50 c.p.s. sine-wave, is in the range from $10^{-12}$ to $10^{-3}$, and is substantially independent of the strength of the applied field, up to and above steady field values of 100 kilovolts per centimeter.

It will thus be seen that the invention has provided means for greatly improving the performance characteristics of electrical apparatus of the general class wherein a strong electric field is to be maintained across a dielectric medium in operation. While a few examples of devices embodying the inventive concept have been described and shown, it will be evident that the invention is in no way limited thereto but can be embodied in various other types of apparatus, and that the particular structural details in any such embodiment will depend on the type and characteristics of the apparatus to which the invention is applied.

It will further be apparent that the invention has provided a method of producing strongly polar liquids of high purity and resistivity, which method may be of value even in cases where it does not form part of the normal operation of some electrical apparatus. Thus, in cases where the dielectric polar liquid is exposed, during the normal operation of some electrical device such as a condenser, to alternating rather than to a unidirectional voltage, steps may be taken to apply the requisite unidirectional field for short periods at intermittent intervals, manually or automatically, to achieve the desired maintenance of the high dielectric constant of the liquid dielectric. As another possibility, the desired purity and/or dielectric characteristics may be imparted to a body of polar liquid by the method of the invention in a separate unit of apparatus specially used for the purpose, and the processed body of liquid then transferred from the central compartment of said apparatus unit to its final site of use. In this last aspect of the invention, the improved process while being carried out in an apparatus which resembles an electrodialysis cell, yet differs profoundly from conventional electrodialysis processes especially in the nature of the liquid which is subjected to the process and the characteristics of the final product.

What is claimed is:

1. Electrical apparatus comprising in combination a pair of spaced electrodes, a voltage source connectable to said electrodes for creating a strong electric field across the space between the electrodes, means defining a pair of side compartments around the respective electrodes, a pair of spaced permeability-selective diaphragms positioned between the electrodes and constituting side walls of the respective side compartments, means defining a central compartment between said diaphragms and separated by the latter from the side compartments, a body of liquid selected from the class of polar liquids capable of assuming high resistivity and dielectric characteristics contained in the central compartment, and additional liquid contained in the side compartments, whereby on creation of said field the liquid in the central compartment will be brought to and maintained in a condition of high resistivity characteristics.

2. Apparatus as defined in claim 1, wherein said permeability-selective diaphragms comprise ion-exchange materials.

3. Apparatus as defined in claim 1, wherein the liquid in the side compartments is initially the same as the liquid in the central compartment.

4. Apparatus as defined in claim 1, wherein the liquid in the side compartments is initially different from the liquid in the central compartment.

5. Apparatus as defined in claim 1, wherein the liquid in one side compartment is acidic and the liquid in the other side compartment is basic.

6. Electrical apparatus comprising container means, a pair of spaced electrodes in the container means, means for applying a high voltage difference across the electrodes, two spaced permeability-selective membranes in the container means between the electrodes and defining three juxtaposed liquid compartments in the container means, a body of polar liquid capable of assuming high dielectric characteristics in the central one of said compartments, and further bodies of liquid in the remaining compartments, whereby on application of said voltage difference said polar liquid in the central compartment will be brought to and maintained in a condition of high dielectric characteristics.

7. Electrical apparatus comprising container means of insulating material, a pair of spaced condenser plates in the container means, means for applying a high D.C. voltage across said plates, spaced permeability-selective membranes between the plates defining a central and side compartment in the container means, a body of polar liquid capable of assuming high dielectric properties contained in the central compartment, and further bodies of liquid contained in the side compartments, whereby on application of a high unidirectional voltage difference to said plates the polar liquid in the central compartment will be brought to a condition of high dielectric characteristics.

8. Apparatus comprising container means of electrically insulating material, a pair of spaced plate electrodes in the container means, means for applying a high unidirectional voltage between the electrodes, spaced permeability-selective membranes between the electrodes defining a central and side compartment in the container means, a body of polar liquid capable of assuming high dielectric properties in the central compartment, further bodies of liquid in the side compartments, and means defining an optical path for a light beam through the opposite walls of the container means across said central compartment in a direction transverse to that of the unidirectional voltage field, whereby on operation of said apparatus as a Kerr cell with said voltage applied to the electrodes the polar liquid in the central compartment will be brought to and maintained in a condition of high dielectric characteristics.

9. Electrical apparatus for producing a high voltage drop, said apparatus comprising, in combination, a permanently sealed container, a positive electrode and a negative electrode positioned within said container in spaced relationship with each other, two spaced permeability-selective membranes disposed in said container and defining a central compartment therebetween, one of said membranes being selectively permeable by negative ions and being located adjacent the positive electrode, the other membrane being selectively permeable by positive ions and being located adjacent the negative electrode, a body of polar liquid capable of assuming high dielectric characteristics in said central compartment, and means for applying a high D.C. voltage across said electrodes to produce a strong electric field across the polar liquid in said compartment, said polar liquid being brought and maintained in a condition of high dielectric characteristics in response to said electric field.

10. In a Kerr cell having a high dielectric constant, in combination, a container means, a positive electrode and a negative electrode positioned within said container means in spaced relationship with each other, only two permeability-selective membranes disposed in said container means, said membranes being substantially planar and being spaced apart in parallel planes to define a central compartment therebetween, one of said membranes being selectively permeable by negative ions and being located adjacent the positive electrode, the other membrane being selectively permeable by positive ions and being located adjacent the negative electrode, a body of polar liquid capable of assuming high dielectric characteristics in said central compartment, means for applying a high D.C. voltage across said electrodes to produce a strong electric field across the polar liquid in said central compartment, said polar liquid being brought and maintained in a condition of high dielectric characteristics in response to said electric field, and means defining an optical light path extending through said container means and across said central compartment in a direction parallel to the planes of said membranes.

11. Electrical apparatus for producing a high voltage drop, said apparatus comprising, in combination, a permanently sealed container, a positive electrode and a negative electrode positioned within said container in spaced relationship with each other, two spaced permeability-selective membranes disposed in said container and defining a central and two side compartments in the container, one of said membranes being selectively permeable by negative ions and being located adjacent the positive electrode, the other membrane being selectively permeable by positive ions and being located adjacent the negative electrode, a static body of polar liquid capable of assuming high dielectric characteristics in said central compartment, further bodies of liquid in the side compartments, and means for applying a high D.C. voltage across said electrodes to produce a strong electric field across the polar liquid in said central compartment, said polar liquid being brought and maintained in a condition of high dielectric characteristics in response to said electric field.

References Cited

UNITED STATES PATENTS

| | | | |
|---|---|---|---|
| 1,866,940 | 7/1932 | Moller | 350—150 X |
| 2,636,852 | 4/1953 | Juda et al. | 204—301 X |
| 2,794,777 | 6/1957 | Pearson | 204—301 X |
| 2,799,638 | 7/1957 | Roberts | 204—301 X |
| 2,978,402 | 4/1961 | Hoch et al. | 204—301 |
| 3,309,301 | 3/1967 | Kollsman | 204—301 X |

DAVID SCHONBERG, Primary Examiner.

P. R. MILLER, Assistant Examiner.

U.S. Cl. X.R.

204—180, 301; 317—230